July 7, 1942. A. CAMPBELL 2,288,784
HOPPER CAR DOOR OPERATING MECHANISM
Filed May 9, 1941 7 Sheets-Sheet 2

Fig-2

INVENTOR:
Argyle Campbell
BY George D. Haight
ATTORNEY.

July 7, 1942.  A. CAMPBELL  2,288,784
HOPPER CAR DOOR OPERATING MECHANISM
Filed May 9, 1941   7 Sheets-Sheet 3

INVENTOR:
Argyle Campbell.
BY
ATTORNEY.

July 7, 1942.  A. CAMPBELL  2,288,784
HOPPER CAR DOOR OPERATING MECHANISM
Filed May 9, 1941  7 Sheets-Sheet 4

INVENTOR:
Argyle Campbell
BY George D. Haight
ATTORNEY.

July 7, 1942.  A. CAMPBELL  2,288,784

HOPPER CAR DOOR OPERATING MECHANISM

Filed May 9, 1941  7 Sheets-Sheet 5

INVENTOR:
Argyle Campbell.
BY George F. Haight
ATTORNEY.

Patented July 7, 1942

2,288,784

UNITED STATES PATENT OFFICE 2,288,784

HOPPER CAR DOOR OPERATING MECHANISM

Argyle Campbell, Chicago, Ill., assignor to Enterprise Railway Equipment Company, Chicago, Ill., a corporation of Illinois Application May 9, 1941, Serial No. 392,714

6 Claims. (Cl. 105—292)

My invention resides in synchronized power transmission mechanism controlled from a point at or near the end of the car for opening or closing a multiple number of doors, including means for automatically locking or unlocking the doors and including means for multiplication of power between the hand operating wheel and the doors sufficient to render the mechanism easy of operation and effective to handle the simultaneous movement of a large number of doors.

My invention further resides in safety mechanism included in the transmission mechanism and arranged to prevent the force of the load upon the opening of the doors from affecting the hand wheel in a manner to throw the operator off balance or otherwise injure him.

My invention further resides in the provision of means for locking the transmission elements against accidental movement after the car doors have been closed and the car made ready for the reception of the load.

My invention further resides in the adaptation of multiple door-operating mechanism to the standard type of car whereby the conventional fixed parts of the car need not be omitted or cut away, or otherwise altered to accommodate the installation of the power transmission mechanism.

My invention further resides in the combination and arrangement of parts hereinafter described and illustrated in the accompanying drawings and defined in the appended claims.

Referring to the accompanying drawings.

For the purpose of illustrating my invention I have selected a car of the hopper type having eight side discharge doors A and B, four on each side of the car, and all of which are intended to be operated simultaneously from one end of the car at a point adjacent the side thereof. It will be obvious, however, that the operating mechanism can be divided or so adapted that half of the number of doors can be operated from points at each end of the car. This car has the conventional type of center-sill C and side discharging hoppers the sloping bottom floors 1 of which extend downwardly from a ridge 2 above the center sill and are supported by bottom cross-ties 3 disposed at intervals along the length of the hopper bottom walls. The discharge openings of the hoppers are covered by the doors A and B which have hinges 4 at their upper edges so that the doors swing outwardly.

In this particular structure the doors on each side are arranged in pairs and connected by means of door braces 5 (Fig. 1), and each pair is actuated by crank mechanism connected to the door brace between the doors of each pair. This crank mechanism includes the crankshafts 6 which extend parallel with the doors beneath the sloping floors 1 of the hopper and through the cross-ties 3, suitable bearings 7 being provided for these shafts.

Figure 1:
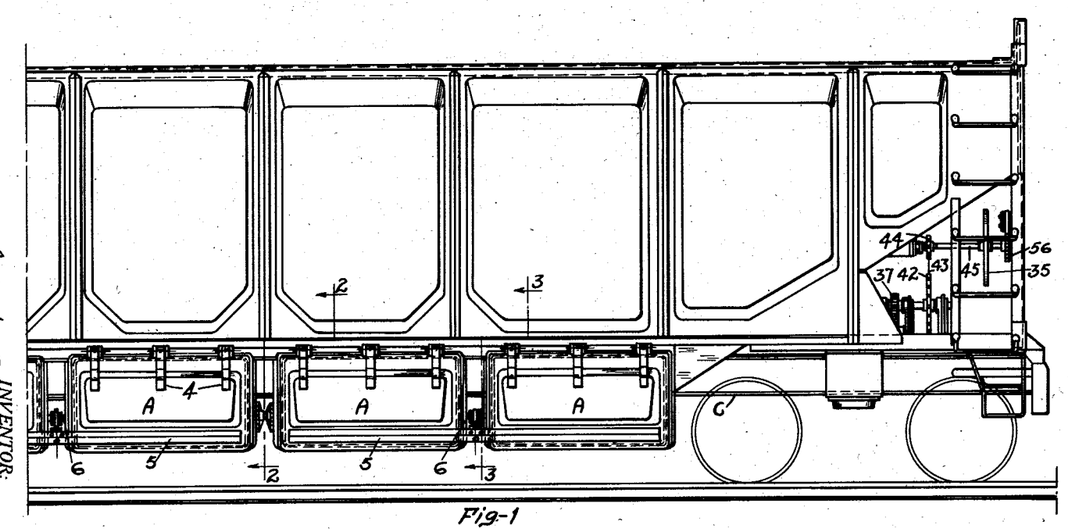
Fig. 1 is a side elevation of the major portion of the length of a hopper car, illustrating the multiple side hopper doors and one end portion of the structure, the other end portion of the car being similar to that shown.

For each pair of doors a crank mechanism is provided and connected to the crankshaft at a point between the doors of the pair, as shown in Fig. 1. Each crankshaft 6, therefore, is common to two pair of doors and extends from about the point between one pair of doors to the point between the other pair of doors. The crank mechanism includes a crank arm 8 (Fig. 3) fastened to the shaft and adapted to be rotated thereby. The outer end of each crank arm is pivotally connected to one end of the connecting rod 9, the other end of which is pivotally connected to an eyebolt 10. This eyebolt extends through the door brace 5 and into a sleeve casting 11 secured by rivets to the door brace. The eyebolt has a nut 12 thereon by which adjustment of the eyebolt is obtained to properly adjust the door-operating mechanism with respect to the hopper opening.

Figure 3:
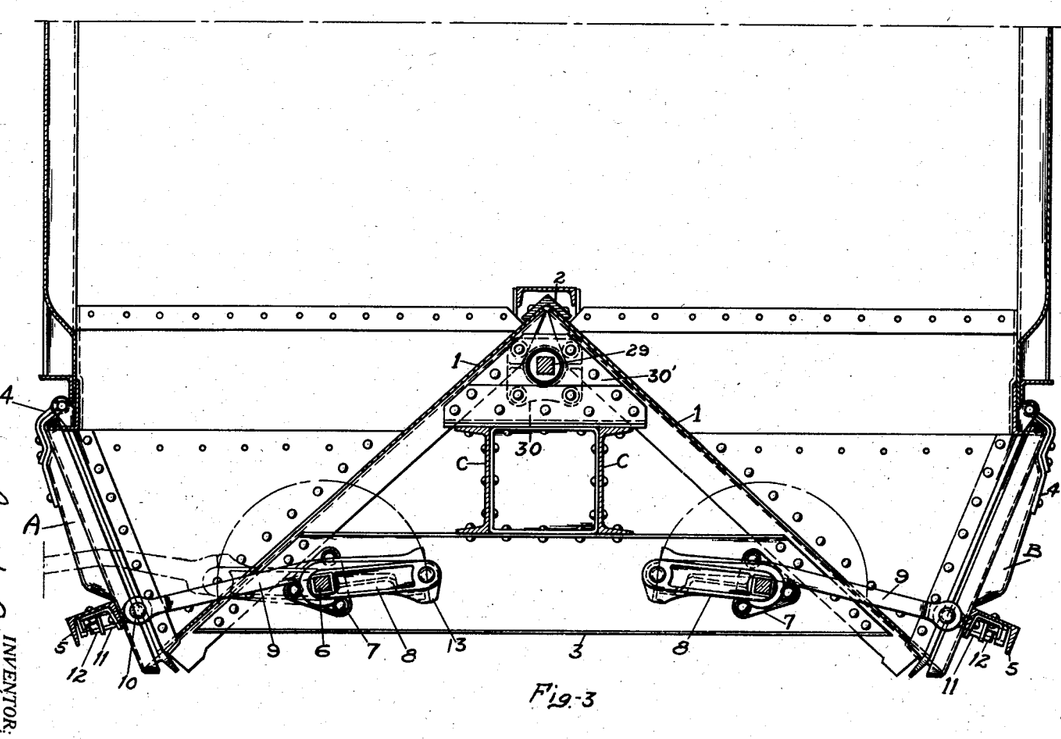
Fig. 3 is an enlarged transverse vertical section substantially on the line 3—3 of Fig. 1, illustrating the crankshafts and connections with the doors.

The connecting rod 9 is especially shaped at its end for locking contact with the outer end of the crank arm 8. Thus the rotation of the shafts 6 through the medium of the crank arms and connecting rods swings the doors to open and closed position.

Figure 2:
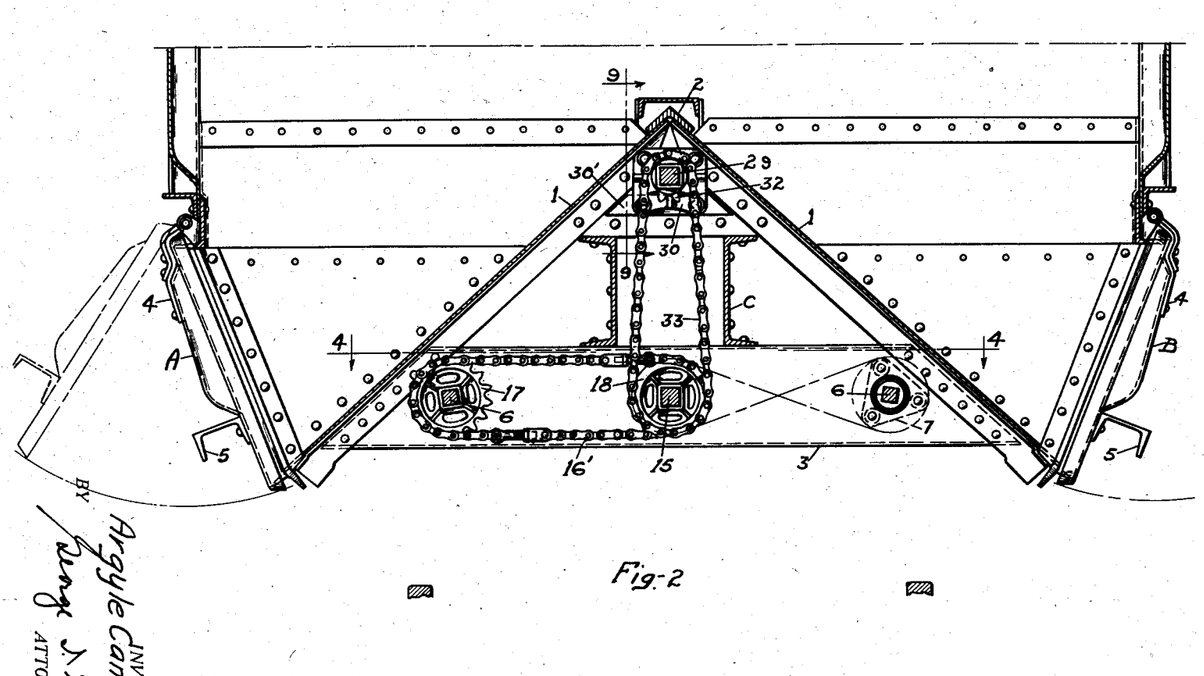
Fig. 2 is an enlarged transverse vertical section substantially on the line 2—2 of Fig. 1 through the hopper and door-operating mechanism to illustrate the chain connections between the several shafts.
Figure 4:
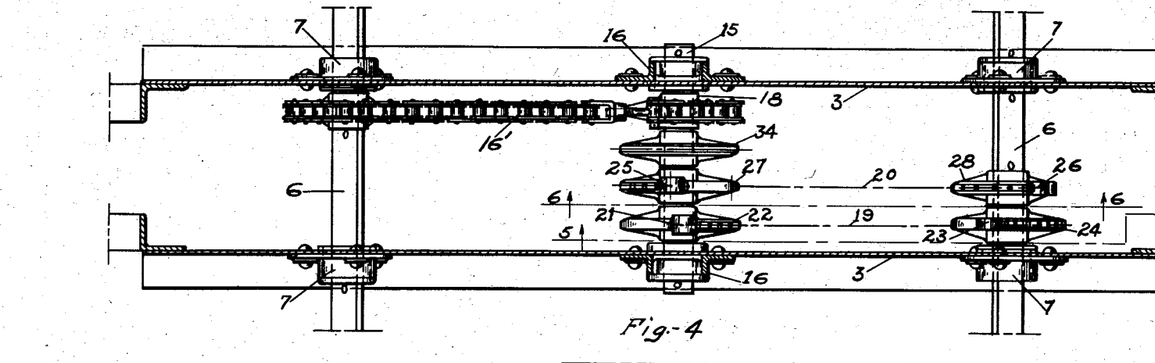
Fig. 4 is an enlarged plan section substantially on line 4—4 of Fig. 2, showing the chain tunnel and chain and sprockets therefor.

The crankshafts 6 are rotated in unison from a short common shaft 15 through the medium of sprocket and chain mechanism. As shown in Fig. 4, it is located about midway of the length of the crankshafts 6 so as to be positioned opposite the points between the adjacent doors of the pairs of doors. This common shaft 15 is disposed beneath the center-sill of the car and substantially midway between the two crankshafts (Figs. 2 and 4) and is mounted in suitable bearings 16 supported by the adjacent cross-tie members 3 which in this particular structure form between them a sort of transverse tunnel for the reception of the chain mechanism.

Since the doors A and B on both sides of the cars are swung in unison, the rotation of the crankshafts 6 must be in opposite directions. This is accomplished by crossing the chain mechanism which extends from the common shaft 15 to one of the crankshafts 6. In this particular structure, by reference to Figs. 2 and 4, it will be seen that the chain 16' which drives the crankshaft 6 to the left of the figure is a continuous loop which extends around the sprocket 17 on shaft 6 and the sprocket 18 on the common shaft 15. Thus counter-clockwise rotation of the common shaft 15 will rotate crankshaft 6 in a counter-clockwise direction to swing the doors open on the corresponding side of the car. On the opposite side of the car, the shaft 6 must be rotated in a clockwise direction to swing the doors outwardly on that side of the car. For this reason it is necessary to cross the chain mechanism so that counter-clockwise rotation of the common shaft 15 will rotate the shaft 6 in a clockwise direction.

Figure 5:
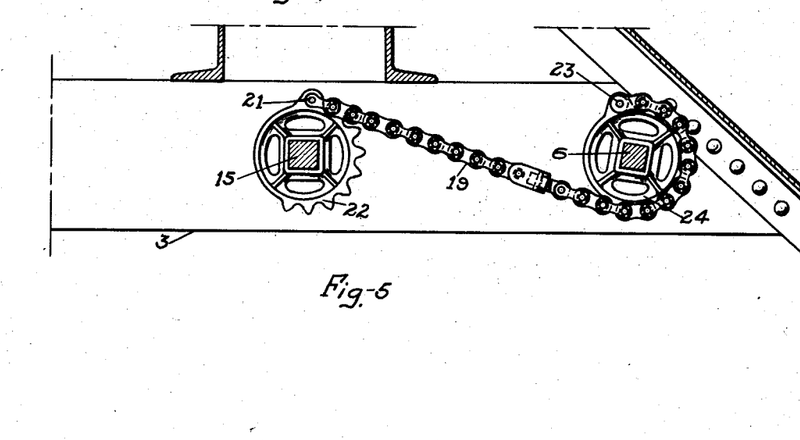
Fig. 5 is a detail vertical section on line 5—5 of Fig. 4, showing one section of the crossed door actuating chain corresponding to the closed position of the doors.
Figures 6, 8, 8A:
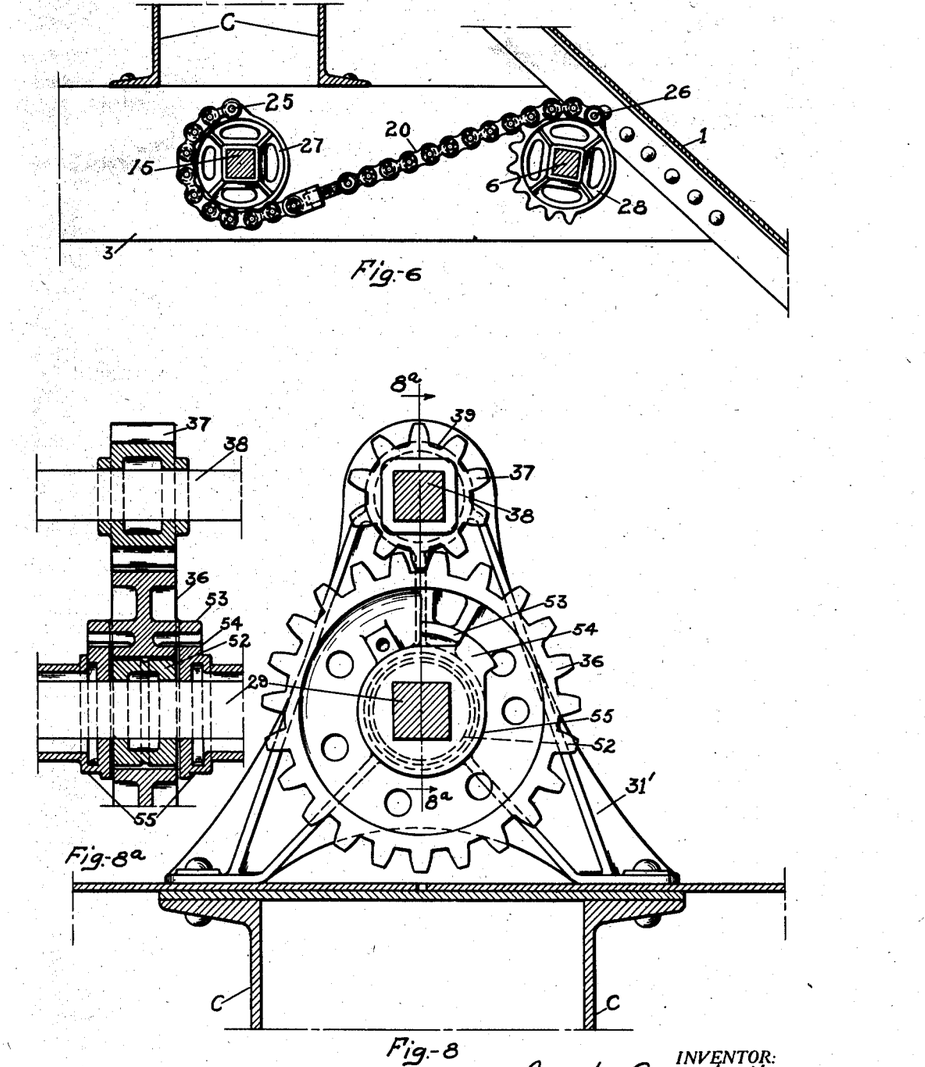
Fig. 6 is a similar view on line 6—6 of Fig. 4, showing the other section of the crossed chain in corresponding position.
Fig. 8 is an enlarged detail vertical section on line 8—8 of Fig. 7, showing the lost motion connection between the gear and its shaft.
Fig. 8a is a vertical detail section on line 8a—8a of Fig. 8.

The chain mechanism for this side of the car, therefore, is arranged in two sections 19 and 20 (Figs. 5 and 6). Section 19 of the chain is anchored at 21 to a sprocket 22 on shaft 15 which other end is connected at 23 to a sprocket 24 on the shaft 6 and winds around the sprocket 24 in the opposite direction to its winding on the sprocket 22. The other section 20 of the chain is likewise connected at its ends 25 and 26 to sprockets 27 and 28, respectively, on the shafts 15 and 6, this section 20 of the chain being disposed in the opposite direction around the sprockets to that of the section 19. Thus rotation of the common shaft 15 in a counter-clockwise direction rotates the crankshafts 6 in opposite directions and swings the doors outwardly in unison on opposite sides of the car. The rotation in clockwise direction of shaft 15 swings the doors simultaneously inwardly to closed position.

The common shaft 15 is driven from a centrally located main shaft 29 which is disposed above the center-sill and beneath the apex or ridge of the sloping floors of the hopper. This shaft extends from a point about midway of the length of the car to a point at one end of the car beneath the sloping end wall thereof, as shown more clearly in Fig. 7. Its inner end is supported in suitable bearings 30 mounted on gusset plates 30' which are secured between the sloping floor angles and the center-sill. Its outer end is likewise supported in bearings 31 on the pedestals 31' which are mounted on the center-sill. At its inner end, which is located above the chain mechanism tunnel, between the bearings 30, the shaft carries a sprocket 32 around which a drive chain 33 is meshed. This chain extends downwardly between the members of the center-sill to a sprocket 34 on the common shaft 15 and provides a driving connection for transmitting power from the main shaft to the common shaft 15 which drives the door-actuating crankshafts. The outer end of the main shaft 29 is driven from a hand wheel 35 through the medium of power-multiplying mechanism. This power-multiplying mechanism includes a spur gear 36 on the main shaft 29 which is driven by a pinion 37 on a counter-shaft 38 which is supported in bearings 39 on the pedestals 31'. A third bearing 40 carried on a third pedestal 41 mounted on the center-sill is provided for the counter-shaft. Between this bearing 40 and the bearing 39 the counter-shaft has a large sprocket 42 which is driven by a chain 43 from a sprocket 44 on the hand wheel shaft 45. The inner end of the hand wheel shaft 45 is supported in a bearing 46 mounted on a bracket 47 secured to the under side of the inclined end wall of the car. The outer end of the hand wheel shaft 45 is supported in a bearing 48 which is supported by a cross-member 49 which extends between the center post 50 and the corner post 51 of the car frame which supports the inclined end of the car body. The positioning of the hand wheel is a matter of choice as to the position from which it is desired that the operator shall control the door mechanism.

Figure 7:
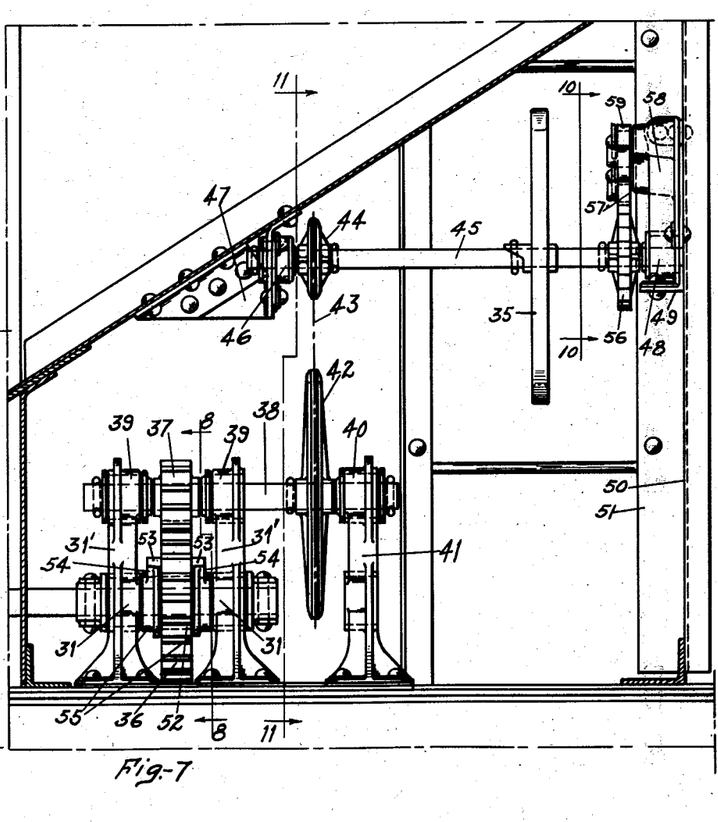
Fig. 7 is a longitudinal vertical section, along the longitudinal center of the car, of the operating end of the car, showing the operating hand wheel and the transmission mechanism operated thereby to open and close the hopper doors.
Figure 9:
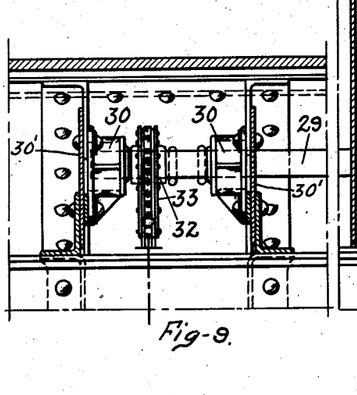
Fig. 9 is a detail vertical section on line 9—9 of Fig. 2.
Figure 10:
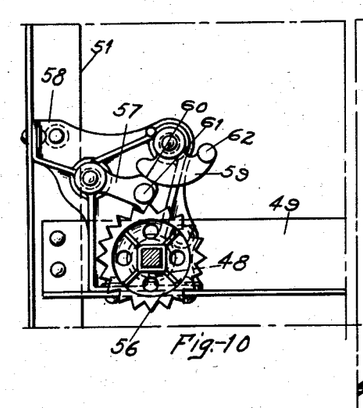
Fig. 10 is a detail section on line 10—10 of Fig. 7.
Figure 11:
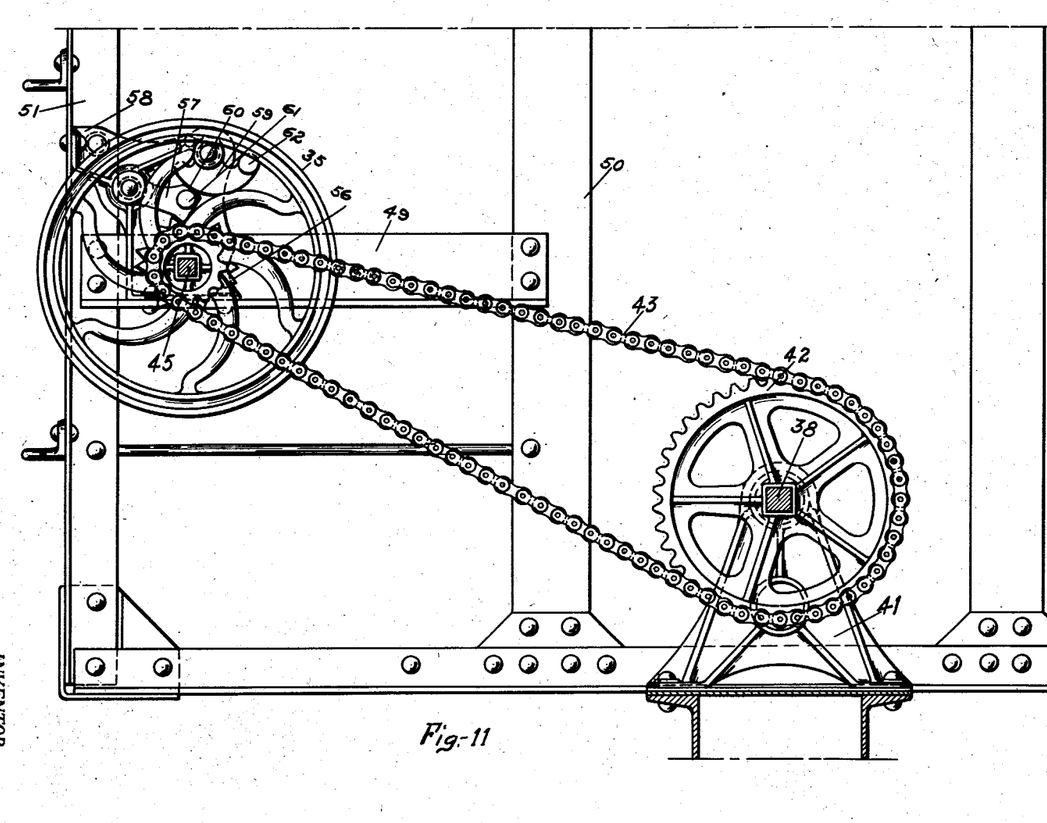
Fig. 11 is an enlarged transverse vertical section on line 11—11 of Fig. 7.

It will thus be seen that between the hand wheel and the main shaft, two stages of speed reduction mechanism are provided. One of these stages includes the drive chain 43 and the sprockets therefor of different diameters on the hand wheel shaft and the counter-shaft 38. The other stage includes the spur gear 36 and pinion 37 of different diameters. This construction provides power transmission mechanism by which the power applied by the operator to the hand wheel is greatly multiplied in transmission to the door-operating mechanism and is sufficient to enable the operator with comparative ease to handle the load imposed upon the mechanism by the large number of doors which are simultaneously operated.

After the doors have been unlocked and released by the partial rotation of the crankshafts 6, the lading in the hopper exerts considerable force against the doors; and while this force assists in swinging the doors open, it might cause the door-actuating and power transmission mechanism all the way back to the hand wheel to move with great rapidity, and start suddenly while the operator is under some strain in initially rotating the hand wheel, throwing the operator off balance or spinning the hand wheel in the operator's hands, or otherwise injuring the operator. In order to provide for the safety of the operator against such contingencies, I provide a lost motion connection in the transmission mechanism. In this particular structure this lost motion connection is located between the spur gear 36 and the main shaft 29.

The gear 36 is rotatable on a bushing 52 which is fast on the shaft 29. The gear carries outstanding lugs 53 on both of its faces. These lugs are intended, upon rotation of the gear, to engage lugs 54 outstanding from the clutch collars 55 (Fig. 8a). These parts are so arranged that the gear 36 has substantially one complete free revolution on the shaft before the lugs engage to form a positive driving connection. Thus, when the operator is rotating the hand wheel in the direction to open the doors, the lugs on the gear and bushing will be in contact and power transmitted sufficient to impart initial movement to the door-operating mechanism to unlock the doors. If, then, the lading suddenly starts the doors moving with great rapidity and the motion transmitted back through the connections to the gear 36, it will cause the gear 36 to rotate faster and its driving pinion and the lugs will leave contact and rotate very nearly a complete revolution during which period the hand gear will remain stationary, thus preventing injury to the operator.

The hand wheel shaft 45 adjacent the outer bearing 48 carries a toothed latch wheel 56 which is engaged by a pivoted latch pawl 57 mounted on a suitable bracket 58 on the frame upright 51. A pivoted locking dog 59 engages a surface 60 on the latch pawl 57 and holds the latch pawl into engagement with the toothed latch wheel 56. Lugs 61 and 62 are provided for the convenience and safety of the operator in operating pawl 57 and locking dog 59. This construction provides a lock for holding the power transmission mechanism from accidental movement after the car doors have been closed and the car made ready for the reception of the load.

Having thus described the working parts of the door-operating mechanism and its application to the car, it will be apparent to those familiar with the art that my invention provides new and novel combinations of elements by which a more convenient and safer means of door operation with much less effort than heretofore is obtained, for cars of the hopper type having longitudinally extending doors on the two sides of the car operated in unison and from the end of the car, and further that this mechanism is applicable to a car of the type wherein a standard form of center-sill construction may be used and the maximum cubic capacity within the car obtained.

In accordance with my invention, it has been my purpose to provide a car the general design and construction of which was first determined and then without change or sacrifice to the car provide a door-operating mechanism having its parts located in co-relation with its other parts and with the car parts, and which can be conveniently applied, operated and maintained without any impairment whatsoever to the car structure.

I claim:

1. In a hopper car construction, the combination of a center-sill, means forming discharge hoppers including sloping floor plates meeting above and closely connected with the center-sill and extending below said center-sill, a main shaft extending lengthwise of the car in the space above the center-sill and enclosed by said sloping floors, a countershaft beneath the center-sill, a driving connection from said shaft to said countershaft extending through the center-sill, doors for the hoppers, means actuated by said countershaft for opening and closing the doors, said main shaft extending to a point adjacent the end wall of the car, a hand wheel positioned adjacent the end of the car, and power-multiplying mechanism connected between said hand wheel and said main shaft for actuating said shaft upon the rotation of the hand wheel.

2. In a hopper car construction, the combination of a center-sill, means forming discharge hoppers including sloping floor plates meeting above and closely connected with the center-sill and extending below said center-sill, a main shaft extending lengthwise of the car in the space above the center-sill and enclosed by said sloping floors, a countershaft beneath the center-sill, a driving connection from said shaft to said countershaft extending through the center-sill, doors for the hoppers, means actuated by said countershaft for opening and closing the doors, said main shaft extending to a point adjacent the end wall of the car, a hand wheel positioned adjacent the end of the car, and power-multiplying mechanism connected between said hand wheel and said main shaft for actuating said shaft upon the rotation of the hand wheel, said power-multiplying mechanism including a countershaft, a chain driving mechanism connecting the last named countershaft and the hand wheel, and speed reduction gearing connecting said last named countershaft and main shaft.

3. In a hopper car construction, the combination of a center-sill, means forming discharge hoppers including sloping floor plates meeting above and closely connected with the center-sill and extending below said center-sill, a main shaft extending lengthwise of the car in the space above the center-sill and enclosed by said sloping floors, a countershaft beneath the center-sill, a driving connection from said shaft to said countershaft extending through the center-sill, doors for the hoppers, means actuated by said countershaft for opening and closing the doors, said main shaft extending to a point adjacent the end wall of the car, a hand wheel positioned adjacent the end of the car, power-multiplying mechanism connected between said hand wheel and said main shaft for actuating said shaft upon the rotation of the hand wheel, said power-multiplying mechanism including a countershaft, a chain driving mechanism connecting the last named countershaft and the hand wheel, speed reduction gearing connecting said last named countershaft and main shaft, and means forming a lost motion driving connection between said gearing and said main shaft, said lost motion connection including a bushing fast to said main shaft and upon which said gearing is rotatably mounted, and interengaging lugs on the gearing and said main shaft.

4. In a hopper car having a center-sill and side discharging hoppers having sloping floors resting upon said center-sill and extending below the center-sill, doors for said hopper on each side of the car, the combination of door-operating mechanism extending beneath the hoppers and below the center-sill and including operating shafts, a main driving shaft extending lengthwise of the car beneath the hopper floors and above the center-sill of the car, a countershaft parallel with and below said center-sill, chain driving connections between the main shaft and said countershaft and extending downwardly through the center-sill, driving connections disposed horizontally below the center-sill and between said countershaft and said door-operating mechanism, a hand wheel at the end of the car, power-multiplying mechanism between the hand wheel and said main shaft, and means for locking the hand wheel and power-multiplying mechanism against accidental operation in the position corresponding to the closed position of the doors.

5. In a hopper car having longitudinal center-sills, transversely and downwardly extending floors resting upon the center-sills and meeting at their bottom edges, and swinging side discharge doors for releasing the load to the two sides of the car, the combination of a door-operating mechanism for opening and closing the car doors in unison from the end of the car comprising a hand wheel at the end of the car, a power multiplying mechanism operated thereby, a main rotatable shaft extending into the hopper section of the car below the hopper floors and above the car center-sills, a pair of longitudinally extending door-operating shafts below the hopper floors and below the center-sills and adjacent the side discharge doors, each door-operating shaft having a locking mechanism thereon connecting with the adjacent car door, a short shaft centrally located below the center-sills at a point in a vertical line with the main shaft and substantially in a horizontal line with the door-operating shafts, sprocket wheels on all of said shafts, and flexible connections between each shaft and the next adjacent shaft, whereby a complete power transmission for the operation of the car doors, in unison, from said hand wheel at the end of the car is provided without sacrifice of load carrying space or the omission of or cutting away parts of the car center-sills.

6. In a hopper car having longitudinal center-sills, transversely and downwardly extending floors resting upon the center-sills and meeting at their bottom edges, and swinging side discharge doors for releasing the load to the two sides of the car, the combination of a door-operating mechanism for opening and closing the car doors in unison from the end of the car comprising a hand wheel at the end of the car, a power multiplying mechanism at the end of the car, a longitudinal main shaft extending intermediate the hopper section of the car located below the longitudinal sloping end floor and transversely sloping central floors and above the center-sills of the car, a lost motion safety connection between the hand wheel and said power multiplying element, a pair of longitudinally extending door-operating shafts, below the transverse sloping central floors and below the center-sills, a locking mechanism on each door-operating shaft having connection to the adjacent car door, a short intermediate longitudinal shaft having sprockets thereon and located below the center-sills and intermediate the said pair of longitudinally extending door-operating shafts, a flexible connection extending vertically through the open space between the center-sills and connected with the longitudinal main shaft, and flexible connections extending in horizontal directions from said intermediate shaft to said door-operating shafts, whereby a complete power transmission for the operation of the car doors, in unison, from a point at the end of the car is provided without sacrifice of load carrying space or the omission of, or cutting away parts of the car center-sills.

ARGYLE CAMPBELL.